(12) United States Patent
Chiang

(10) Patent No.: US 8,331,716 B2
(45) Date of Patent: Dec. 11, 2012

(54) NOISE REDUCTION METHOD

(75) Inventor: Jia-Jie Chiang, Pingjhen (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 1220 days.

(21) Appl. No.: 11/808,683

(22) Filed: Jun. 12, 2007

(65) Prior Publication Data
US 2008/0107353 A1 May 8, 2008

(30) Foreign Application Priority Data
Nov. 8, 2006 (TW) .............................. 95141248 A

(51) Int. Cl.
*G06K 9/40* (2006.01)
*G06K 9/38* (2006.01)

(52) U.S. Cl. ........................................ 382/260; 382/275

(58) Field of Classification Search .................. None
See application file for complete search history.

(56) References Cited

U.S. PATENT DOCUMENTS
2002/0159648 A1* 10/2002 Alderson et al. .............. 382/260
2004/0101184 A1* 5/2004 Sivaramakrishna et al. .. 382/131
2007/0230756 A1* 10/2007 Wen et al. ..................... 382/128

OTHER PUBLICATIONS
Matlab (Mathworks) "medifilt1", http://www.mathworks.com/access/helpdesk/help/toolbox/signal/medfilt1.html, Dec. 4, 2005.*

* cited by examiner

*Primary Examiner* — Randolph I Chu
(74) *Attorney, Agent, or Firm* — McClure, Qualey & Rodack, LLP

(57) ABSTRACT

The invention discloses a noise reduction method for reducing noises of an image frame, wherein the image frame consists of a plurality of data rows. The method of the invention includes following step of selectively performing a one-dimensional median algorithm at least twice and a slope algorithm at least once. Accordingly, the noises of the image frame can be reduced effectively.

7 Claims, 7 Drawing Sheets

NOISE REDUCTION METHOD

BACKGROUND OF THE INVENTION

1. Field of the Invention

The invention relates to a noise reduction method and, more particularly, relates to a method for effectively reducing noises of an image frame by using a one-dimensional median algorithm and a slope algorithm.

2. Description of the Prior Art

In order to reduce noises of an image frame, various methods have been disclosed to date. In these methods, the conventional median algorithm is usually put to use. Referring to FIG. 1A and FIG. 1B, FIG. 1A is a schematic diagram illustrating a sub-matrix 10 of an image frame 1 before processed by a median algorithm, and FIG. 1B is a schematic diagram illustrating the sub-matrix 10 of the image frame 1 after processed by a median algorithm. The median algorithm comprises the following steps of: (a) in pixel matrix of the image frame 1, selecting the sub-matrix 10 with a target pixel in the center; (b) sorting gray levels of all pixels within the sub-matrix 10; and (c) selecting a median value of the gray levels to be a new gray level of the target pixel. It should be noted that the sub-matrix can be a 3*3 matrix, a 5*5 matrix, or the like.

As shown in FIG. 1, the sub-matrix 10 is a 3*3 matrix comprising nine pixels, and gray levels of the pixels are sorted in magnitude as 11, 23, 23, 49, 51, 51, 54, 98, and 99. In other words, a median value of the gray levels of the pixels in the sub-matrix 10 is 51. Therefore, according to the median algorithm, the gray level (23) of the target pixel will be replaced with the median value (51) as shown in FIG. 1B.

However, when the median algorithm is used for reducing noises of an image frame, a memory is needed for storing two-dimensional image data, and then a follow-up calculation can be performed. By this manner, a large amount of data has to be stored, and the processing efficiency is lower. If the median algorithm can be performed on one-dimensional image data, the processing efficiency will get higher, and the memory for storing the image data can be removed. However, if the median algorithm is performed on one-dimensional image data, that will cause large error.

Accordingly, the scope of the invention is to provide a noise reduction method for solving the aforesaid problems.

SUMMARY OF THE INVENTION

A scope of the invention is to provide a noise reduction method for effectively reducing noises of an image frame by using a one-dimensional algorithm and a slope algorithm.

According to a preferred embodiment, a noise reduction method of the invention is used for reducing noises of an image frame, wherein the image frame consists of a plurality of data rows. The noise reduction method of the invention comprises step of selectively performing a one-dimensional median algorithm on each data row of the image frame at least twice and performing a slope algorithm on each data row of the image frame at least once.

For example, if the noise reduction method of the invention performs the one-dimensional median algorithm on each data row of the image frame twice and performs the slope algorithm on each data row of the image frame once, the processing procedure can be one of the following situations. (1) The one-dimensional median algorithm is performed twice first, and then the slope algorithm is performed once. (2) The one-dimensional median algorithm is performed once first, the slope algorithm is then performed once, and the one-dimensional median algorithm is performed once again. (3) The slope algorithm is performed once first, and then the one-dimensional median algorithm is performed twice. Accordingly, noises of the image frame can be reduced effectively.

Therefore, because the noise reduction method of the invention performs the one-dimensional median algorithm and the slope algorithm on one-dimensional image data to reduce noises of an image frame, the memory for storing the image data can be removed, and the processing efficiency will get higher.

The advantage and spirit of the invention may be understood by the following recitations together with the appended drawings.

BRIEF DESCRIPTION OF THE APPENDED DRAWINGS

DETAILED DESCRIPTION OF THE INVENTION

According to a preferred embodiment, the noise reduction method of the invention is used for reducing noises of an image frame, wherein the image frame consists of a plurality of data rows. The noise reduction method of the invention comprises step of selectively performing a one-dimensional median algorithm on each data row of the image frame at least twice and performing a slope algorithm on each data row of the image frame at least once. Accordingly, the noises of the image frame can be reduced effectively.

Figures 1A, 1B:
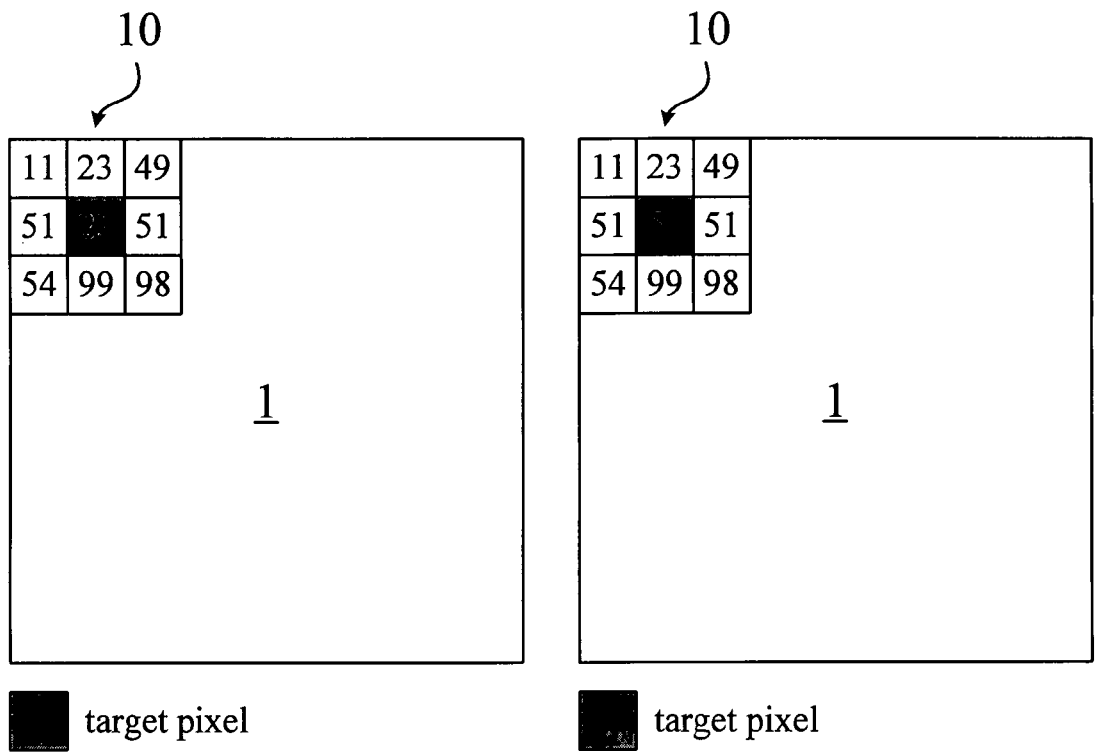
FIG. 1A is a schematic diagram illustrating a sub-matrix of an image frame before processed by a median algorithm.
FIG. 1B is a schematic diagram illustrating the sub-matrix of the image frame after processed by a median algorithm.
Figure 2:
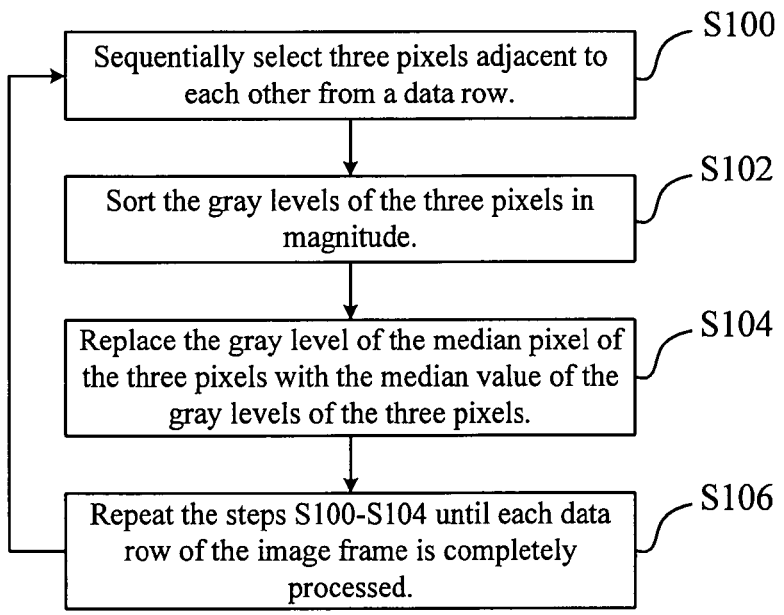
FIG. 2 is a flow chart illustrating a one-dimensional median algorithm.
Figure 3A:
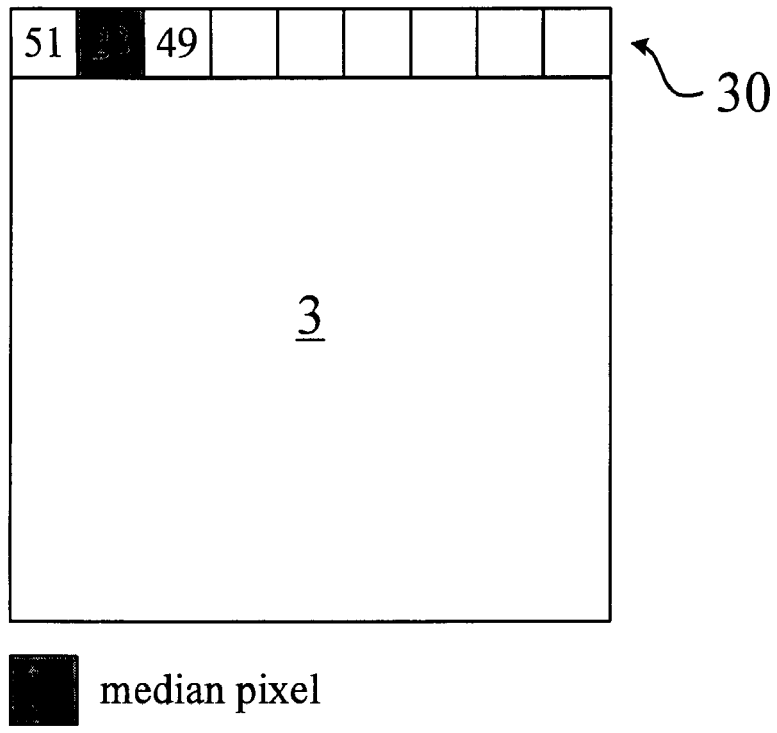
FIG. 3A is a schematic diagram illustrating a data row of an image frame before processed by the one-dimensional median algorithm.
Figure 3B:
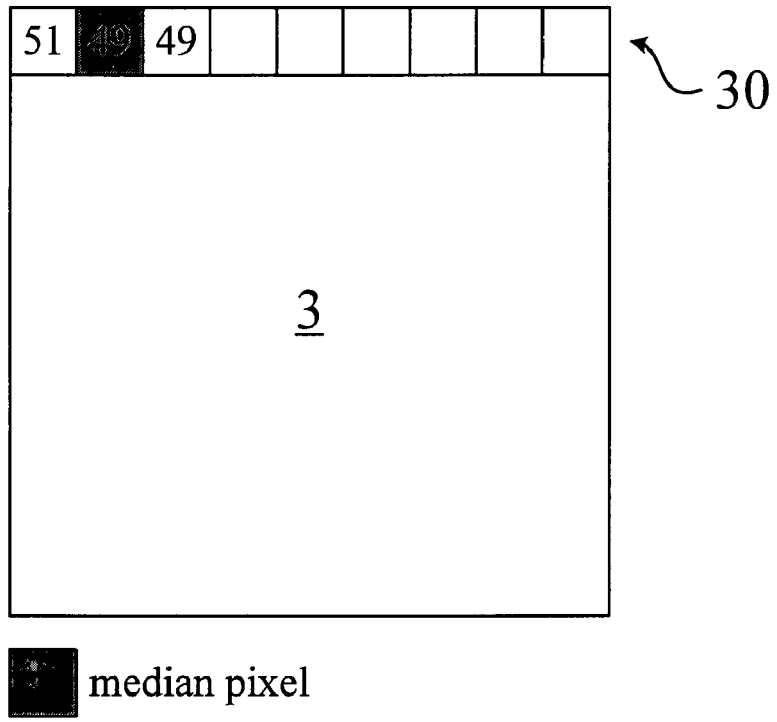
FIG. 3B is a schematic diagram illustrating the data row of the image frame after processed by the one-dimensional median algorithm.

Referring to FIG. 2, FIG. 3A, and FIG. 3B, FIG. 2 is a flow chart illustrating a one-dimensional median algorithm, FIG. 3A is a schematic diagram illustrating a data row 30 of an image frame 3 before processed by the one-dimensional median algorithm, and FIG. 3B is a schematic diagram illustrating the data row 30 of the image frame 3 after processed by the one-dimensional median algorithm. As shown in FIG. 2, the one-dimensional median algorithm of the invention comprises the following steps. In the beginning, step S100 is performed to sequentially select three pixels adjacent to each other from the data row 30, wherein the corresponding gray levels are 51, 23, and 49 respectively, as shown in FIG. 3A. Afterward, step S102 is performed to sort the gray levels of the three pixels in magnitude, such that the order of the gray levels is 23, 49, and 51. Step S104 is then performed to replace the gray level (23) of the median pixel of the three pixels with the median value (49) of the gray levels of the three pixels, as shown in FIG. 3B. Finally, step S106 is performed to repeat the steps S100-S104 until each data row of the image frame 3 is completely processed. It should be noted that when the first pixel of the data row 30 is being processed, a value which is equal to zero is added to the front of the first pixel; and when the last pixel of the data row 30 is being processed, a value which is equal to zero is added to the back of the last pixel.

Figure 4:
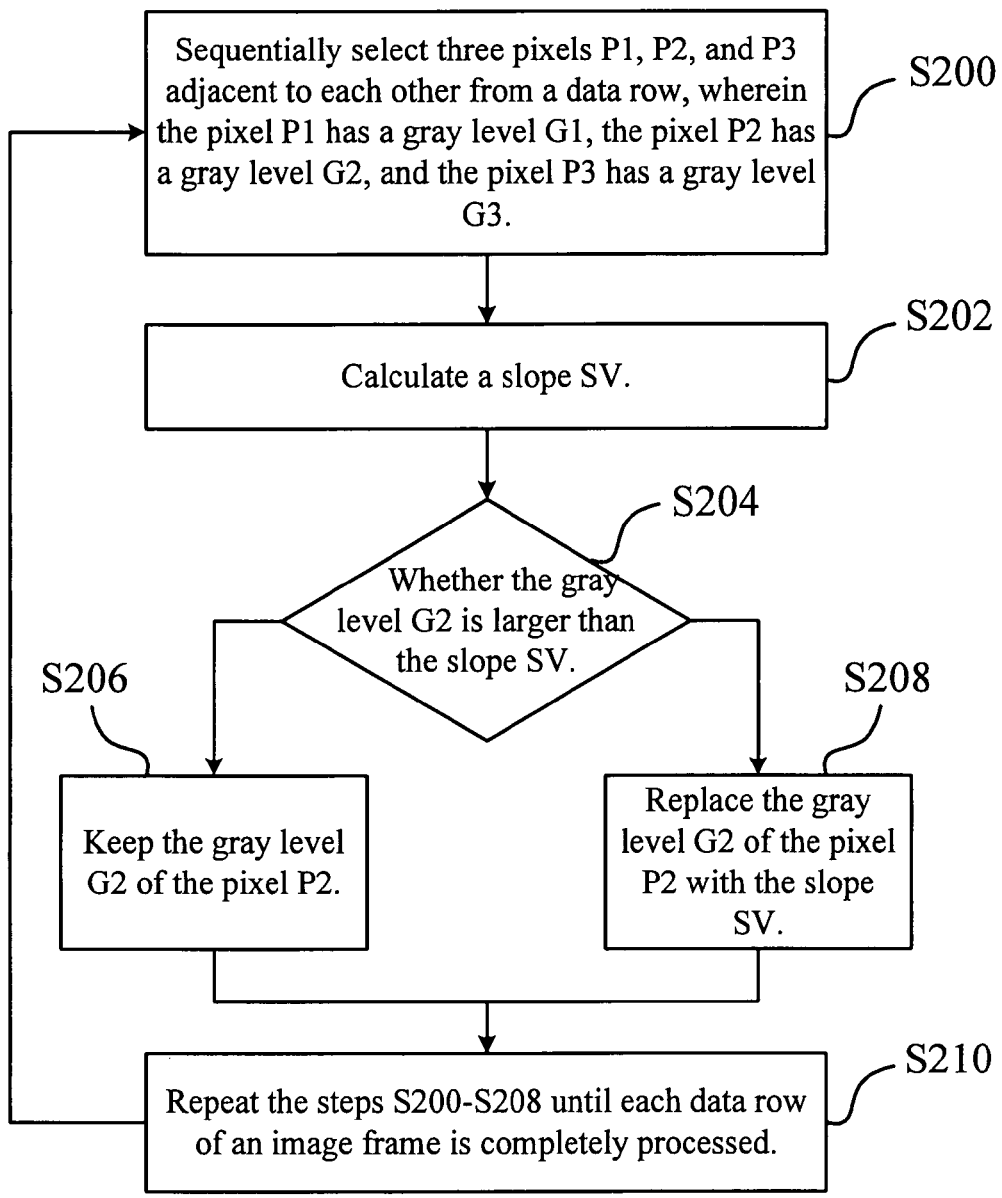
FIG. 4 is a flow chart illustrating a slope algorithm.

Referring to FIG. 4, FIG. 4 is a flow chart illustrating a slope algorithm. The slope algorithm of the invention comprises the following steps. In the beginning, step S200 is performed to sequentially select three pixels P1, P2, and P3 adjacent to each other from a data row, wherein the pixel P1 has a gray level G1, the pixel P2 has a gray level G2, and the pixel P3 has a gray level G3. Afterward, step S202 is performed to calculate a slope SV according to the following formula: $SV = \sqrt{G1^2 + G3^2}/2$. Step S204 is then performed to compare the gray level G2 with the slope SV, and if the gray level G2 is larger than the slope SV, step S206 is performed, otherwise, step S208 is performed. Step S206 is performed to keep the gray level G2 of the pixel P2. Step S208 is performed to replace the gray level G2 of the pixel P2 with the slope SV. Finally, step S210 is performed to repeat the steps S200-S208 until each data row of an image frame is completely processed. It should be noted that when the first pixel of the data row is being processed, a value which is equal to zero is added to the front of the first pixel; and when the last pixel of the data row is being processed, a value which is equal to zero is added to the back of the last pixel.

Figure 5A:
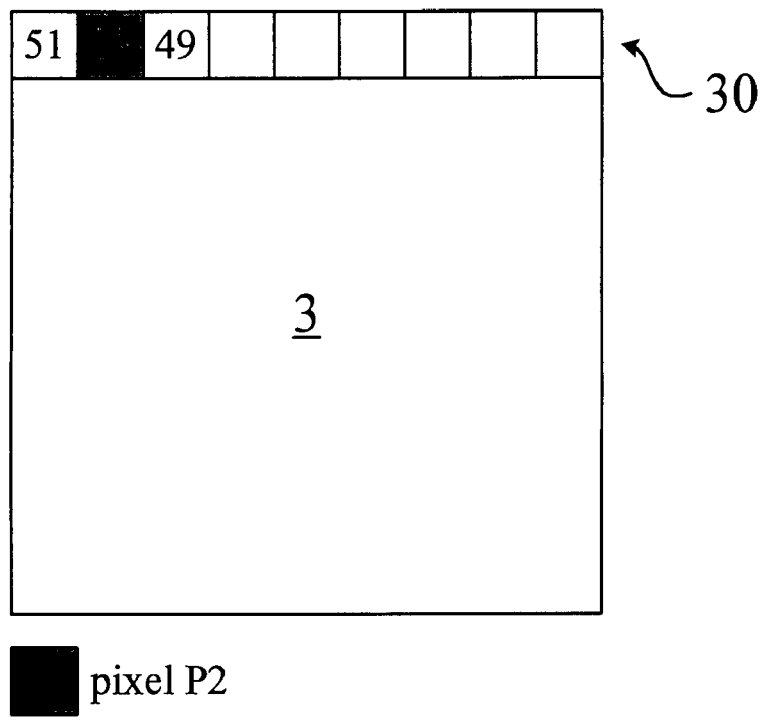
FIG. 5A is a schematic diagram illustrating a data row of an image frame before processed by the slope algorithm.
Figure 5B:
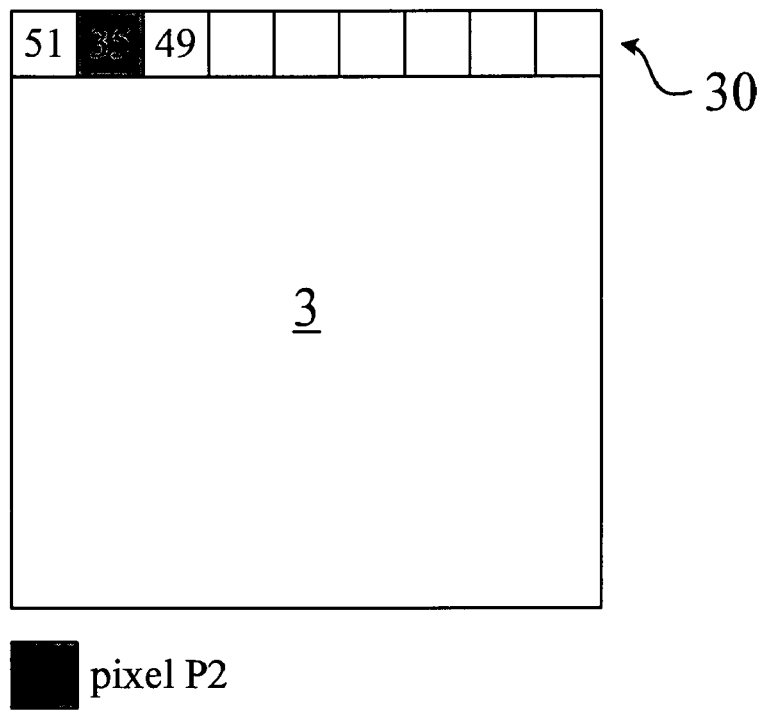
FIG. 5B is a schematic diagram illustrating the data row of the image frame after processed by the slope algorithm.

Referring to FIG. 5A and FIG. 5B, FIG. 5A is a schematic diagram illustrating the data row 30 of the image frame 3 before processed by the slope algorithm, and FIG. 5B is a schematic diagram illustrating the data row 30 of the image frame 3 after processed by the slope algorithm. As shown in FIG. 5A, three pixels adjacent to each other are sequentially selected from the data row 30, wherein the corresponding gray levels are 51, 23, and 49 respectively, and the slope SV is equal to 35. Because the slope (35) is larger than the gray level (23) of the pixel P2, the gray level (23) of the pixel P2 is replaced with the slope (35), as shown in FIG. 5B.

Figure 6:
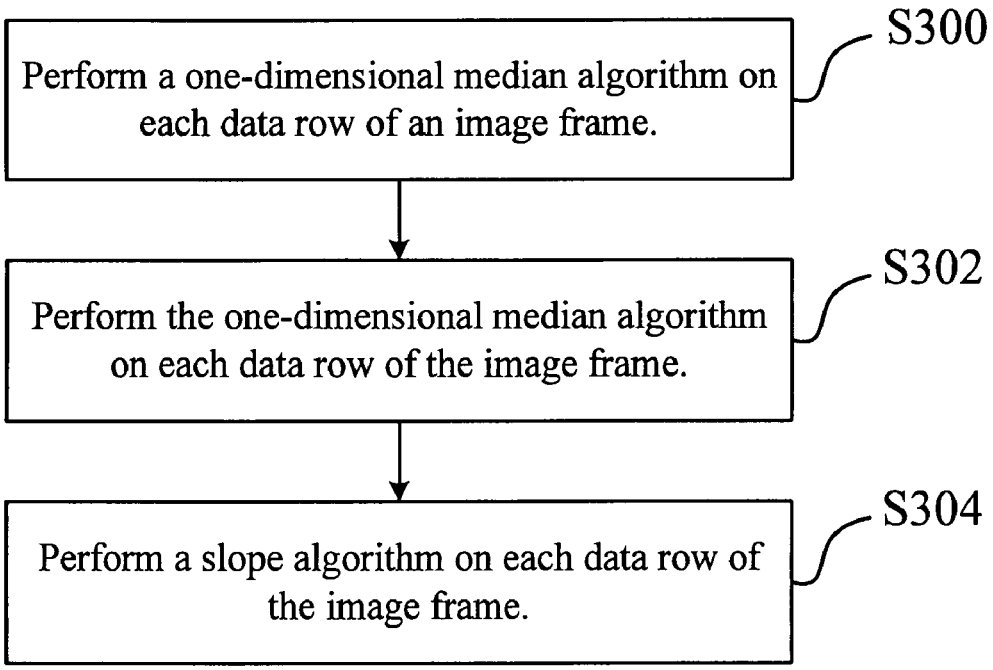
FIG. 6 is a flow chart illustrating a noise reduction method according to a preferred embodiment of the invention.

Referring to FIG. 6, FIG. 6 is a flow chart illustrating a noise reduction method according to a preferred embodiment of the invention. In this embodiment, the noise reduction method comprises the following steps. In the beginning, step S300 performs a one-dimensional median algorithm on each data row of an image frame. Afterward, step S302 performs the one-dimensional median algorithm again on each data row of the image frame. Finally, step S304 performs a slope algorithm on each data row of the image frame. Accordingly, noises of the image frame can be reduced effectively.

Figure 7:
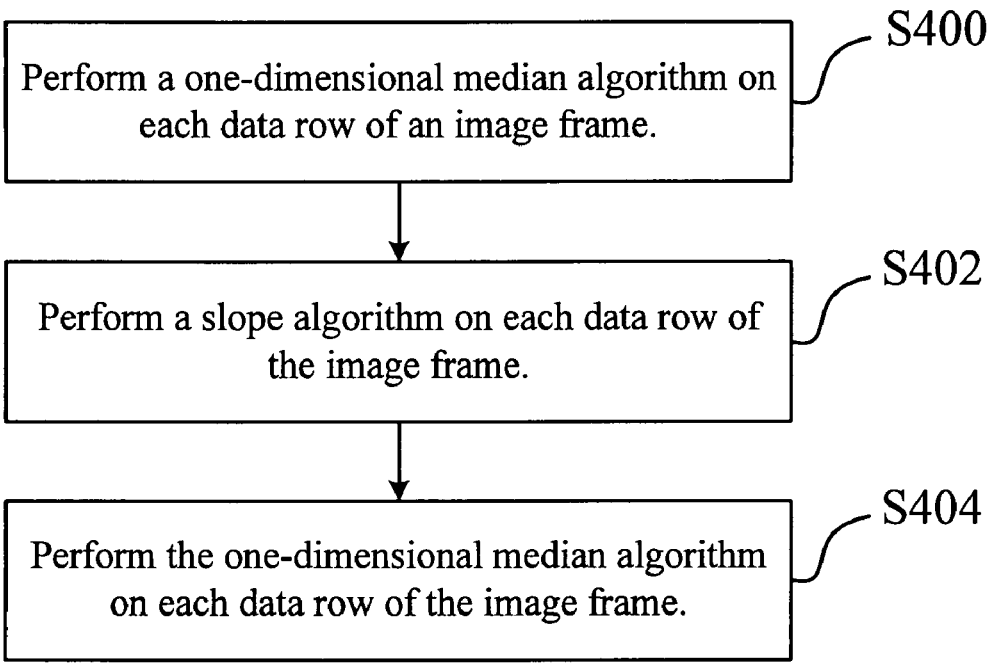
FIG. 7 is a flow chart illustrating a noise reduction method according to another preferred embodiment of the invention.

Referring to FIG. 7, FIG. 7 is a flow chart illustrating a noise reduction method according to another preferred embodiment of the invention. In this embodiment, the noise reduction method comprises the following steps. In the beginning, step S400 performs a one-dimensional median algorithm on each data row of an image frame. Afterward, step S402 performs a slope algorithm on each data row of the image frame. Finally, step S404 performs the one-dimensional median algorithm again on each data row of the image frame. Accordingly, noises of the image frame can be reduced effectively.

Figure 8:
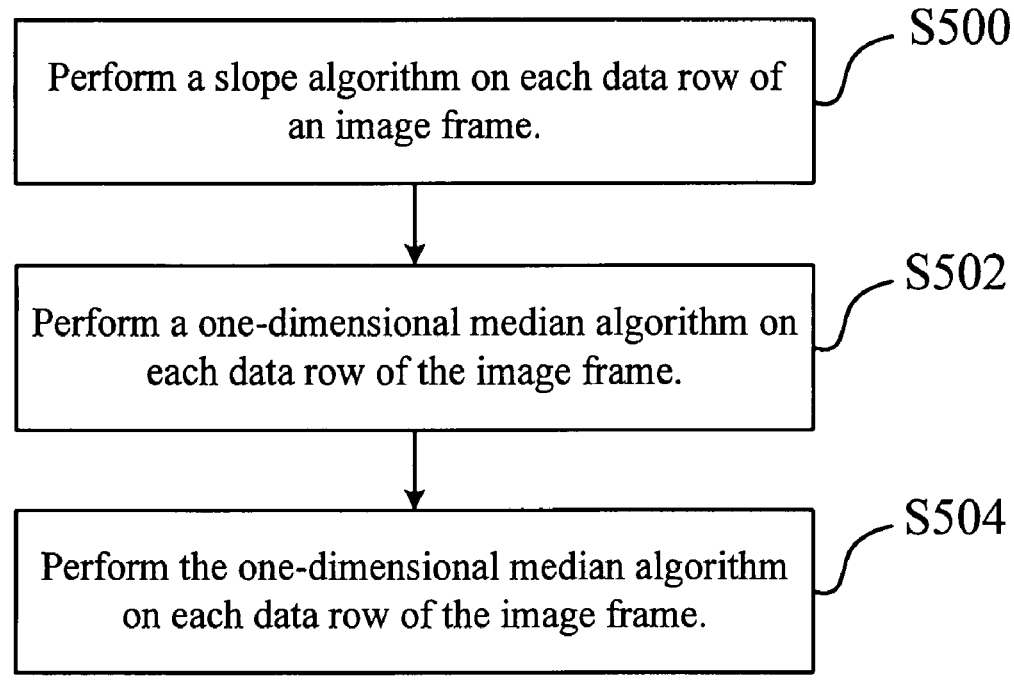
FIG. 8 is a flow chart illustrating a noise reduction method according to another preferred embodiment of the invention.

Referring to FIG. 8, FIG. 8 is a flow chart illustrating a noise reduction method according to another preferred embodiment of the invention. In this embodiment, the noise reduction method comprises the following steps. In the beginning, step S500 performs a slope algorithm on each data row of an image frame. Afterward, step S502 performs a one-dimensional median algorithm on each data row of the image frame. Finally, step S504 performs the one-dimensional median algorithm again on each data row of the image frame. Accordingly, noises of the image frame can be reduced effectively.

Figure 9:
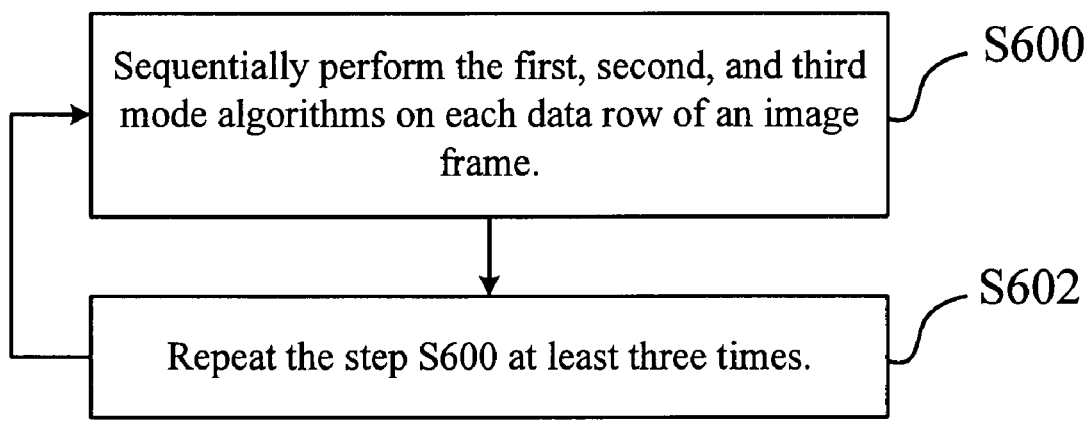
FIG. 9 is a flow chart illustrating a powerful noise reduction method according to another preferred embodiment of the invention.

Referring to FIG. 9, FIG. 9 is a flow chart illustrating a powerful noise reduction method according to another preferred embodiment of the invention. In the invention, the noise reduction method shown in FIG. 6 can be further defined as a first mode algorithm, the noise reduction method shown in FIG. 7 can be further defined as a second mode algorithm, and the noise reduction method shown in FIG. 8 can be further defined as a third mode algorithm. In this embodiment, the powerful noise reduction method comprises the following steps. In the beginning, step S600 sequentially performs the first, second, and third mode algorithms on each data row of an image frame. Afterward, step S602 is performed to repeat the step S600 at least three times. Accordingly, noises of the image frame can be greatly and effectively reduced. It should be noted that, in the step S600, the sequence of performing the first, second, and third mode algorithms can be designed based on practical applications.

Figures 10A, 10B:
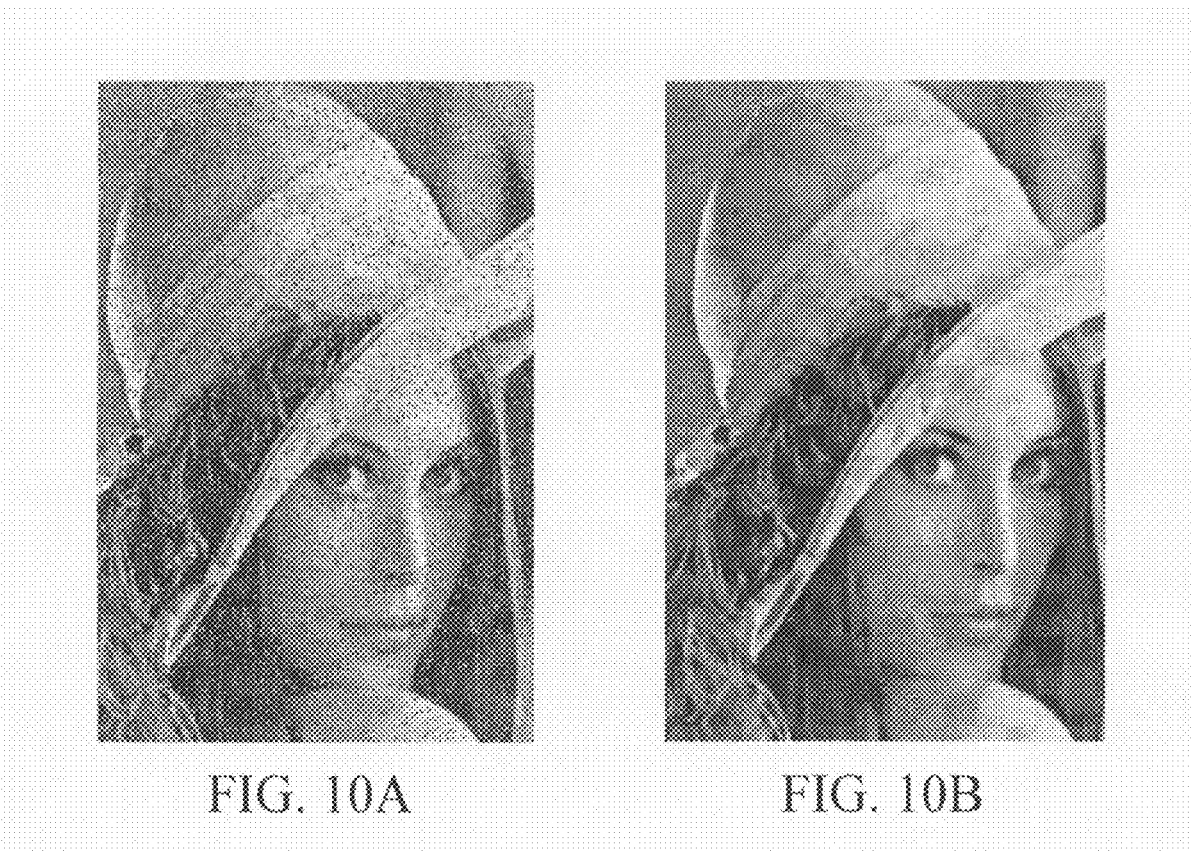
FIG. 10A shows an image frame before processed by the noise reduction method of the invention.
FIG. 10B shows the image frame after processed by the noise reduction method of the invention.

Referring to FIG. 10A and FIG. 10B, FIG. 10A shows an image frame before processed by the noise reduction method of the invention, and FIG. 10B shows the image frame after processed by the noise reduction method of the invention. Obviously, the noise reduction method of the invention can greatly and effectively reduce noises of the image frame.

Compared to the prior art, because the noise reduction method of the invention performs the one-dimensional median algorithm and the slope algorithm on one-dimensional image data to reduce noises of an image frame, the memory for storing the image data can be removed, and the processing efficiency will get higher.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A noise reduction method for reducing noises of an image frame, the image frame consisting of a plurality of data rows, the method comprising step of:
   selectively performing a one-dimensional median algorithm on each data row of the image frame at least twice and performing a one-dimensional slope algorithm on each data row of the image frame at least once.

2. The method of claim 1, wherein the one-dimensional median algorithm comprises steps of:
   sequentially selecting three pixels adjacent to each other from a data row;
   sorting gray levels of the three pixels in magnitude;

replacing a gray level of a median pixel of the three pixels with a median value of the gray levels of the three pixels; and repeating the aforesaid steps until each data row is completely processed.

3. The method of claim 2, wherein when a first pixel of the data row is being processed, a value which is equal to zero is added to the front of the first pixel.

4. The method of claim 2, wherein when a last pixel of the data row is being processed, a value which is equal to zero is added to the back of the last pixel.

5. A noise reduction method for reducing noises of an image frame, the image frame consisting of a plurality of data rows, the method comprising step of:

selectively performing a one-dimensional median algorithm on each data row of the image frame at least twice and performing a slope algorithm on each data row of the image frame at least once, wherein the slope algorithm comprises steps of:

sequentially selecting three pixels P1, P2, and P3 adjacent to each other from a data row, wherein the pixel P1 has a first gray level G1, the pixel P2 has a second gray level G2, and the pixel P3 has a third gray level G3;

calculating a slope SV according to a formula: $SV=\sqrt{G1^2+G3^2}/2$;

comparing the second gray level with the slope, if the second gray level is larger than the slope, keeping the second gray level of the pixel P2, otherwise, replacing the second gray level of the pixel P2 with the slope; and repeating the aforesaid steps until each data row is completely processed.

6. The method of claim 5, wherein when a first pixel of the data row is being processed, a value which is equal to zero is added to the front of the first pixel.

7. The method of claim 5, wherein when a last pixel of the data row is being processed, a value which is equal to zero is added to the back of the last pixel.

* * * * *